United States Patent
Jang

(10) Patent No.: US 9,533,675 B2
(45) Date of Patent: Jan. 3, 2017

(54) METHOD FOR CONTROLLING BATTERY OF MILD HYBRID VEHICLE

(71) Applicant: MANDO CORPORATION, Pyeongtaek-si, Gyeonggi-do (KR)

(72) Inventor: In Gyu Jang, Suwon-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/873,174

(22) Filed: Oct. 1, 2015

(65) Prior Publication Data

US 2016/0096521 A1 Apr. 7, 2016

(30) Foreign Application Priority Data

Oct. 7, 2014 (KR) .................. 10-2014-0135309

(51) Int. Cl.
*B60W 20/00* (2016.01)
*B60L 11/18* (2006.01)

(52) U.S. Cl.
CPC ........... *B60W 20/13* (2016.01); *B60L 11/1862* (2013.01); *B60W 20/12* (2016.01)

(58) Field of Classification Search
CPC .................. B60W 20/13; B60K 6/00
See application file for complete search history.

(56) References Cited

U.S. PATENT DOCUMENTS

| | | | | |
|---|---|---|---|---|
| 8,296,032 | B2* | 10/2012 | Wang | B60K 6/445 701/51 |
| 8,849,485 | B2* | 9/2014 | Christ | B60L 1/003 180/65.275 |
| 9,085,301 | B2* | 7/2015 | Taguchi | B60W 30/143 |
| 9,191,854 | B2* | 11/2015 | Yamamoto | H04W 52/282 |
| 9,199,648 | B2* | 12/2015 | Bar | B60W 30/18154 |
| 2008/0029318 | A1* | 2/2008 | Proietty | B60K 6/48 180/65.265 |

FOREIGN PATENT DOCUMENTS

KR 1020050048278 A 5/2005

* cited by examiner

*Primary Examiner* — Thomas Tarcza
*Assistant Examiner* — Alex C Dunn
(74) *Attorney, Agent, or Firm* — Hauptman Ham, LLP

(57) ABSTRACT

A method for controlling the battery of a mild hybrid vehicle, according to an embodiment of the present invention, includes: a first step of detecting the traffic conditions based on the driving state of the vehicle; and a second step of adjusting the target SOC of an energy storage device based on the detected traffic conditions.

8 Claims, 10 Drawing Sheets

METHOD FOR CONTROLLING BATTERY OF MILD HYBRID VEHICLE

CROSS-REFERENCE TO RELATED APPLICATION

This application claims priority from and the benefit under 35 U.S.C. §119(a) of Korean Patent Application No. 10-2014-0135309, filed on Oct. 7, 2014, which is hereby incorporated by reference for all purposes as if fully set forth herein.

BACKGROUND OF THE INVENTION

1. Field of the Invention

The present invention relates to a method for controlling the battery of a mild hybrid vehicle and, more specifically, to a method for determining a target State of Charge (SOC) of an energy storage device of a mild hybrid vehicle based on traffic conditions.

2. Description of the Prior Art

Vehicle manufacturers have made an effort to improve fuel economy and develop eco-friendly vehicles in response to the increase of social interest in rising oil prices and the environment, and hybrid systems that regenerate and use the deceleration energy of vehicles have emerged in order to satisfy this demand.

In the related art, in order to control the battery charging state of a hybrid vehicle, the compensation value for an engine torque is calculated from the output of a motor based on information, such as the State of Charge (SOC) of the battery, power of a low-voltage battery that supplies power to an electric field load side of the vehicle, a driving environment (an angle of inclination and external temperature), and the like, and then an operating point (an engine torque output point according to a current engine RPM) of an engine is finally determined based on the calculated compensation value.

However, the control method in the related art does not consider road/traffic conditions and accordingly, does not maximize a Stop and Go function that has a great effect of fuel economy improvement and a regenerative energy use function. For example, in cases where the battery charging state is maintained to be a single target SOC, the Stop and Go function cannot be sufficiently utilized in heavy traffic congestion. In contrast, maximum regenerative energy has to be used in road/traffic conditions that have a large regenerative quantity, but unnecessary engine power generation occurs in order to manage the battery, thereby increasing fuel consumption.

The related art document below discloses a technology of controlling Idle Stop and Go and behavior based on information transmitted from a traffic control center, but does not disclose a technical feature of the present invention wherein a target SOC of an energy storage device of a mild hybrid vehicle is adjusted based on a driving condition of a vehicle.

CITATION LIST

Patent Document (Patent Document 1) Korean Patent publication No. 2005-0048278

SUMMARY OF THE INVENTION

An aspect of a method for controlling the battery of a mild hybrid vehicle, according to an embodiment of the present invention, is to address at least the above-mentioned problems and/or disadvantages and to provide at least the advantages described below.

An aspect of the present invention is to provide a method for controlling a battery of a mild hybrid vehicle that can determine a target SOC of an energy storage device of the mild hybrid vehicle by detecting road traffic conditions that vary in real time, thereby improving the fuel economy of the mild hybrid vehicle.

Aspects of the present invention are not limited to the aforementioned aspect, and other unmentioned aspects may be clearly understood by those skilled in the art from the following statements.

A method for controlling the battery of a mild hybrid vehicle, according to a first embodiment of the present invention, includes: a first step of detecting the traffic conditions based on the driving state of the vehicle; and a second step of adjusting a target SOC of an energy storage device based on the detected traffic conditions, wherein the first step includes: a step 1-1 of setting a first range of interest based on the number of times that the vehicle stops; and a step 1-2 of detecting the number of times that Stop and Go does not operate due to a low SOC of the energy storage device within the first range of interest.

The second step may preferably include a step 2-1 of comparing the number of times that the Stop and Go does not operate with the first and second reference values set in advance, a step 2-2 of increasing the target SOC of the energy storage device may be preferably performed when the number of times that the Stop and Go does not operate is larger than the first reference value, a step 2-3 of decreasing the target SOC of the energy storage device may preferably be performed when the number of times that the Stop and Go does not operate is smaller than the preset second reference value, and the first reference value may be preferably larger than the second reference value.

A method for controlling the battery of a mild hybrid vehicle, according to a second embodiment of the present invention, includes: a first step of detecting traffic conditions based on the driving state of the vehicle; and a second step of adjusting a target SOC of an energy storage device based on the detected traffic condition, wherein the first step preferably includes: a step 1-3 of setting a second range of interest for detecting the trend of an SOC of the energy storage device; and a step 1-4 of calculating an average of the SOC of the energy storage device within the second range of interest.

The second step may preferably include a step 2-4 of comparing an absolute value of the difference between the calculated average of the SOC of the energy storage device and the target SOC of the energy storage device with a third reference value set in advance.

The second step may preferably further include a step 2-5 of comparing the calculated average of the SOC of the energy storage device and the magnitude of the target SOC of the energy storage device when the absolute value of the difference between the calculated average of the SOC of the energy storage device and the target SOC of the energy storage device is larger than the preset third reference value, a step 2-6 of decreasing the target SOC of the energy storage device may be preferably performed when the calculated average of the SOC of the energy storage device is larger than the target SOC of the energy storage device, and a step 2-7 of increasing the target SOC of the energy storage device may be preferably performed when the calculated average of the SOC of the energy storage device is smaller than the target SOC of the energy storage device.

The battery control method may preferably further include a third step of storing the adjusted target SOC of the energy storage device in a memory.

The methods for controlling the battery of a mild hybrid vehicle, according to the embodiments of the present invention, can adjust a target SOC of an energy storage device on the basis of traffic conditions detected based on the driving state of a vehicle in order to prevent fuel consumption caused by unnecessary engine power generation, thereby improving fuel economy.

Effects of the present invention are not limited to the aforementioned one, and other unmentioned effects may be clearly understood by those skilled in the art from the following statements.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
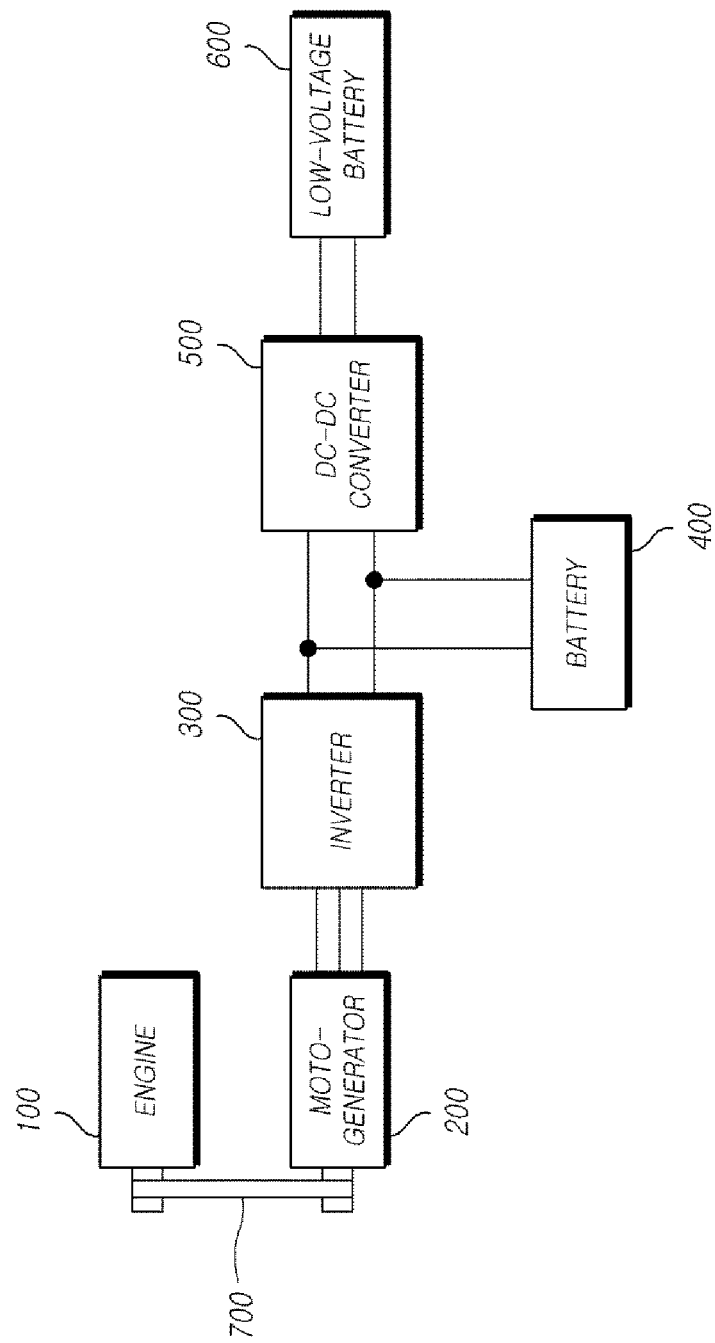
FIG. 1 is a block diagram illustrating a configuration of a battery charge state control device of a mild hybrid vehicle.

Hereinafter, exemplary embodiments of the present disclosure will be described in detail with reference to the accompanying drawings, equal or similar elements are assigned an equal reference numeral, and an overlapping description thereof will be omitted.

Further, in the following description of the present invention, a detailed description of known technologies incorporated herein will be omitted when it may make the subject matter of the present disclosure rather unclear. Further, it should be noted that the accompanying drawings are intended only for the easy understanding of the technical idea of the present invention, and the spirit of the present invention should not be construed as being limited by the accompanying drawings.

Figure 2:
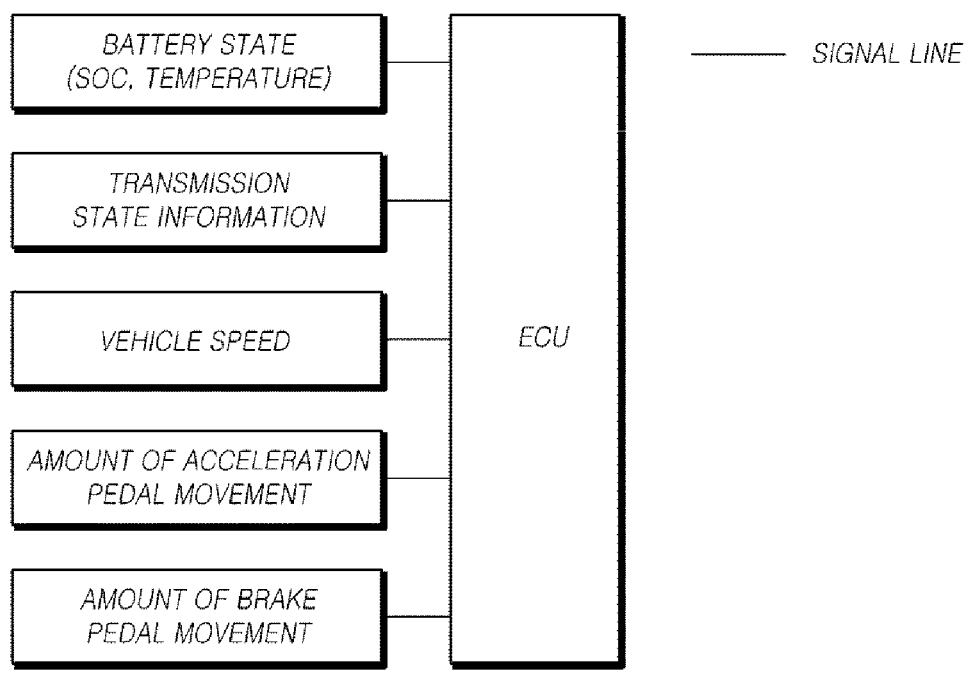
FIG. 2 is a diagram illustrating signals input to an electronic control unit in the battery charge state control device of the mild hybrid vehicle.

An overall configuration of a mild hybrid device, according to the present invention, will be described with reference to FIGS. 1 and 2, prior to a description of a method for controlling a battery of a mild hybrid vehicle according to the present invention. FIG. 1 is a block diagram illustrating a configuration of the battery charge state control device of a mild hybrid vehicle. FIG. 2 is a diagram illustrating signals that are input to an electronic control unit in the battery charge state control device of the mild hybrid vehicle.

As illustrated in FIG. 1, the mild hybrid device, according to the present invention, may include an engine 100, a motor-generator 200, an inverter 300, an energy storage device 400, a DC-DC converter 500, a low-voltage battery 600, a belt 700, and an electronic control unit (ECU, not illustrated).

The motor-generator 200 interworks with the engine 100 through the belt 700, and may operate as both a start motor to starting the engine 100 and a generator that can generate an AC voltage.

Specifically, the motor-generator 200 receives driving power through the inverter 300 and assists with engine power when functioning as a start motor, and supplies electrical energy, which is generated during the braking of a vehicle, to the energy storage device 400 when functioning as a generator.

In particular, the hybrid device has a Stop and Go function by which an engine automatically stalls while a vehicle stops for a long time and restarts when the vehicle starts. In some cases, Stop and Go is also referred to as Idle Stop & Go (ISG).

Meanwhile, in the Stop and Go, the hybrid device supplies a voltage that is charged in the energy storage device 400 to the low-voltage battery 600 through the converter 500 when the charged voltage of the energy storage device 400 is higher than or equal to a reference voltage during a stop.

The inverter 300, which controls electrical energy input to or output from the motor-generator 200, functions to convert electrical energy supplied from the energy storage device 400 and to supply the converted electrical energy to the motor-generator 200, or functions to convert electrical energy generated by the motor-generator 200 and to supply the converted electrical energy to the energy storage device 400.

The energy storage device 400 may be constituted with a super-capacitor module that includes a plurality of super-capacitors, and functions to collect regeneratively braked electrical energy from the motor-generator 200 when the vehicle decelerates and to assist with an engine torque by supplying electrical energy to the motor-generator 200 when the vehicle accelerates. Further, the energy storage device 400 may be a lithium-based high-voltage battery, such as a lithium ion battery, a lithium polymer battery, or the like.

As illustrated in FIG. 2, the electronic control unit functions to control the elements of the hybrid device based on inputs that are calculated through various types of sensors disposed in the vehicle, such as the state of the energy storage device (a battery charge rate or a battery temperature), the state of the transmission, the speed of the vehicle, an amount of acceleration pedal movement, an amount of brake pedal movement, and the like.

Figure 3:
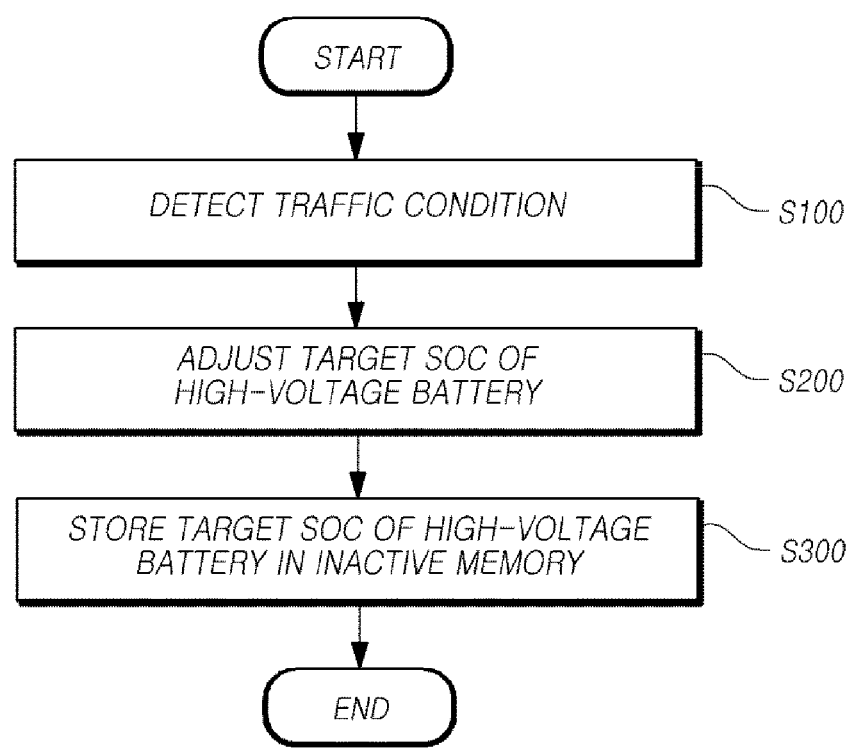
FIG. 3 is a flowchart illustrating a general method for controlling the battery of a mild hybrid vehicle, according to the present invention, in a time-based order.

Hereinafter, a method for controlling the battery of a mild hybrid vehicle, according to the present invention, will be described with reference to FIG. 3 and the above description of the overall configuration of the hybrid device. FIG. 3 is a flowchart illustrating a general method for controlling the battery of a mild hybrid vehicle, according to the present invention, in a time based order.

As illustrated in FIG. 3, the method for controlling the battery of a mild hybrid vehicle, according to the present invention, includes a first step S100 of detecting traffic conditions and a second step S200 of adjusting the Target State of Charge (Target SOC) of the energy storage device 400. Particularly, in the first step S100, the traffic condition is detected based on the driving state of the vehicle, instead of being acquired and detected from a configuration external to the vehicle, such as a traffic control center, as described in the above-described related art document, and a detailed description thereof will be given below. Further, in the second step S200, the target SOC of the energy storage device 400 is adjusted based on the traffic condition detected in the first step S100.

In addition, a third step S300 of storing the adjusted target SOC of the energy storage device 400 in a memory is preferably added after the first and second steps S100 and S200. That is, when the vehicle stalls, the adjusted target SOC of the energy storage device 400 is stored in an inactive memory of the electronic control unit to prevent the adjusted target SOC from being erased, and when a driver restarts the vehicle, the previous target SOC of the energy storage device 400 stored in the memory is read, and the target SOC of the energy storage device 400 is preferably adjusted based on the previous target SOC. Namely, an optimal target SOC of the energy storage device may be applied through learning a road traffic condition by which the driver frequently drives the vehicle, thereby improving fuel economy.

Meanwhile, in the cases of the first step S100 of detecting the traffic condition based on the driving state of the vehicle, two embodiments may be specifically considered, and specific contents of each embodiment will be hereinafter described.

Figure 4:
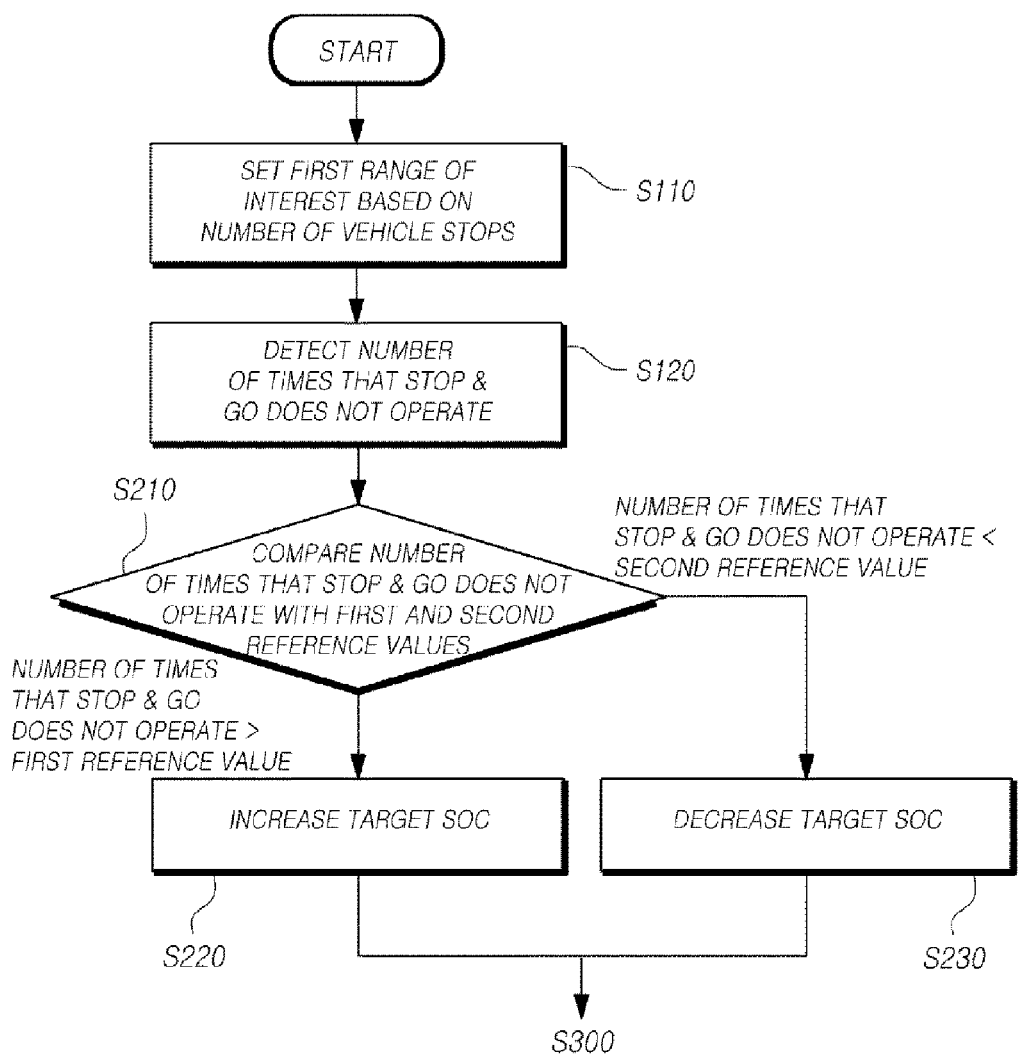
FIG. 4 is a flowchart illustrating a method for controlling the battery of a mild hybrid vehicle, according to a first embodiment of the present invention, in a time-based order.
Figure 5:
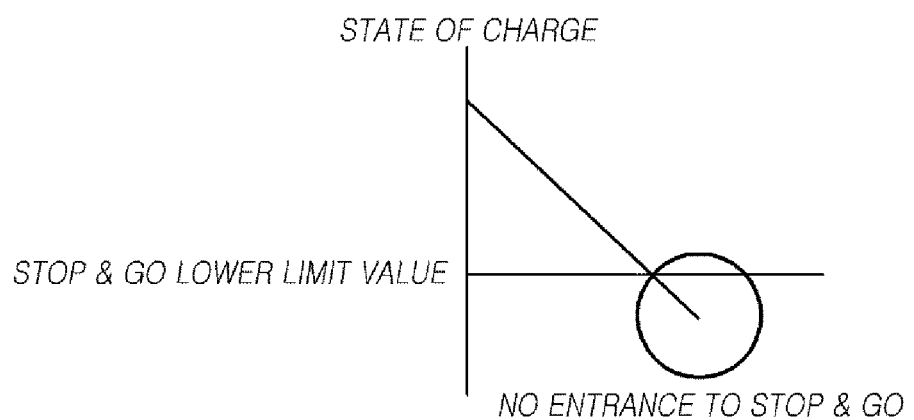
FIGS. 5 and 6 are views for explaining the method for controlling the battery of a mild hybrid vehicle according to the first embodiment of the present invention.
Figure 6:
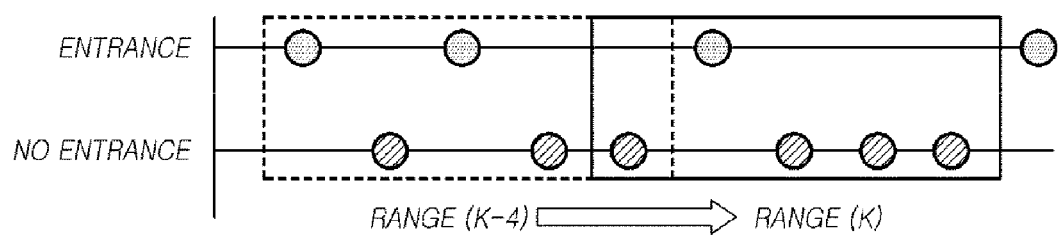

First, a method for controlling the battery of a mild hybrid vehicle, according to a first embodiment of the present invention, will be described. FIG. 4 is a flowchart illustrating the method for controlling the battery of a mild hybrid vehicle, according to the first embodiment of the present invention, in a time based order, and FIGS. 5 and 6 are views for explaining the method for controlling the battery of a mild hybrid vehicle according to the first embodiment of the present invention. As illustrated in FIG. 4, first step S100 in the method for controlling the battery of a mild hybrid vehicle, according to the first embodiment of the present invention, may include step 1-1 (S110) of setting a first range of interest based on the number of times that a vehicle stops and step 1-2 (S120) of detecting the number of times that Stop and Go does not operate. As illustrated in FIG. 5, Stop and Go is set to not operate in a mild hybrid system for an energy storage device when the SOC of the energy storage device is lower than or equal to a predetermined numerical value (a Stop & Go lower limit value), and a target SOC of the energy storage device is adjusted based on the charging state of the energy storage device 400 and the traffic condition.

The step 1-1 (S110) and the step 1-2 (S120) of the method for controlling the battery of a mild hybrid vehicle, according to the first embodiment of the present invention, will be described with reference to FIG. 6. As illustrated in FIG. 6, the first range of interest is set based on the number of times that the vehicle stops; namely, based on the number of times that the condition for an entrance to Stop and Go occurs. For example, as illustrated in FIG. 6, the first range of interest is set based on the assumption that the number of times that an entrance to the Stop and Go can be made is five, and the number of times that the Stop and Go does not operate because the SOC of the energy storage device 400 is smaller than a Stop and Go lower limit value although the entrance to the Stop and Go is possible is counted. The first range of interest is set to move as illustrated in FIG. 6 every time the condition for an entrance to the Stop and Go occurs, thereby making it possible to continually perform the step 1-1 (S110), and a user may preferably set the first range of interest by changing a count number as needed.

After the step 1-1 (S110) and the step 1-2 (S120) are preformed, the second step S200 of adjusting a target SOC of the energy storage device 400 is performed. In the method for controlling the battery of a mild hybrid vehicle, according to the first embodiment of the present invention, a process of comparing the number of times that the Stop and Go does not operate, which is detected in the step 1-2 (S120), with the first and second reference values set in advance and adjusting the target SOC of the energy storage device 400 based on the comparison result is performed, and the first reference value is set to a higher value than the second reference value in the second step S200 as illustrated in FIG. 4. More specifically describing the second step S200, step 2-1 (S210) of comparing the number of times that the Stop and Go does not operate with the preset first and second reference values is performed, and then step 2-2 (S220) of raising the target SOC of the energy storage device 400 is performed when the comparison result shows that the number of times that the Stop and Go does not operate is larger than the first reference value, thereby increasing the engine start frequency and the Stop and Go operation frequency. In contrast, when the number of times that the Stop and Go does not operate is smaller than the second reference value, step 2-3 (S230) of reducing the target SOC of the energy storage device 400 is performed. Consequently, in this case, the first range of interest is determined to be an interval where there is a large amount of regenerative energy, and thus the target SOC of the energy storage device 400 is lowered, thereby decreasing the engine power-generation frequency and increasing the amount of regenerative energy that can be collected. Meanwhile, when the number of times that the Stop and Go does not operate is between the first and second reference values, the target SOC of the energy storage device 400 is maintained as it is without a change.

Figure 7:
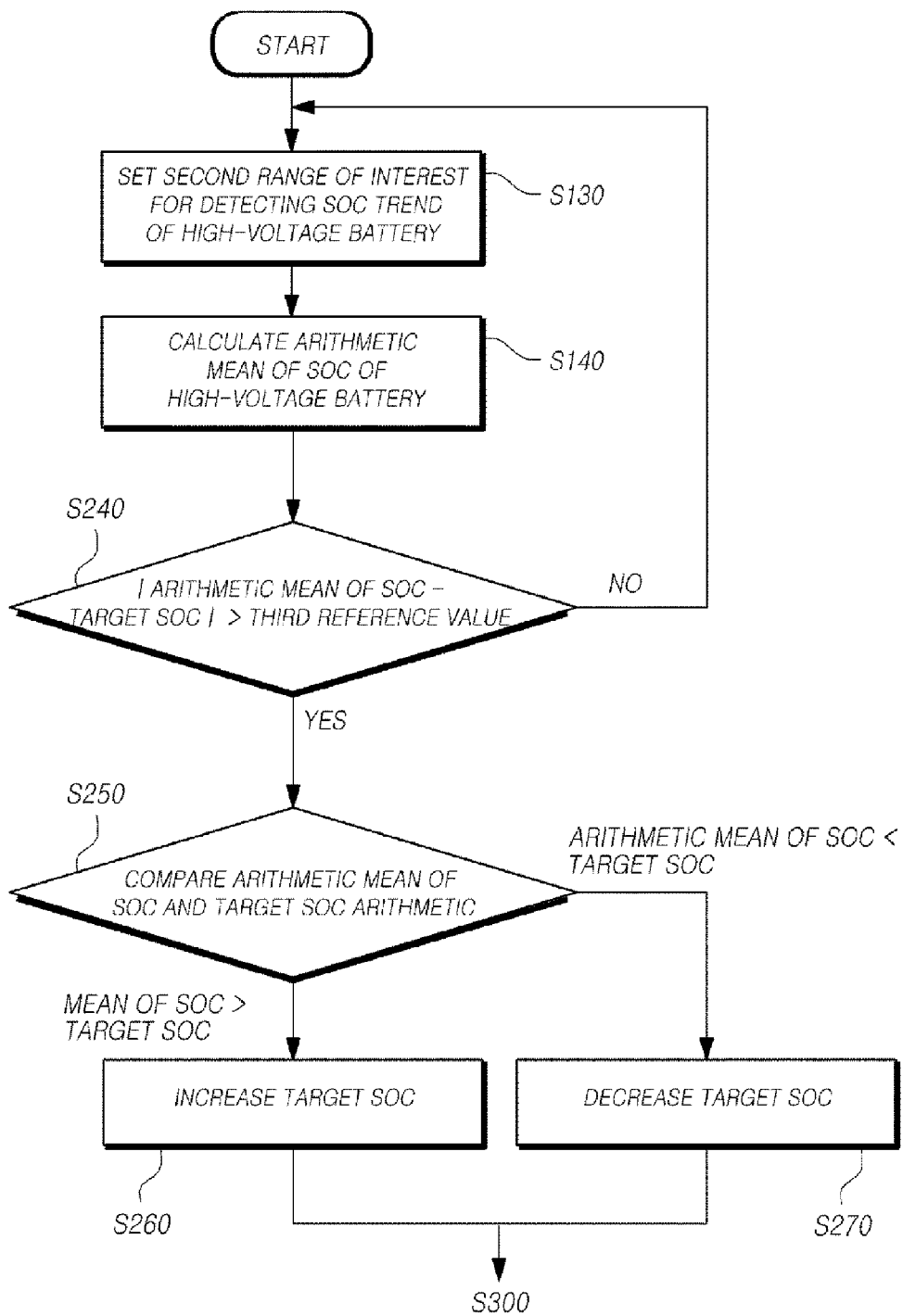
FIG. 7 is a flowchart illustrating a method for controlling the battery of a mild hybrid vehicle, according to a second embodiment of the present invention, in a time-based order.

Hereinafter, a method for controlling the battery of a mild hybrid vehicle, according to a second embodiment of the present invention, will be described. FIG. 7 is a flowchart illustrating the method for controlling the battery of a mild hybrid vehicle, according to the second embodiment of the present invention, in a time based order, and FIGS. 8 and 9 are views for explaining the method for controlling a battery of a mild hybrid vehicle according to the second embodiment of the present invention.

As illustrated in FIG. 7, the first step S100 in the method for controlling the battery of a mild hybrid vehicle, according to the second embodiment of the present invention, may include step 1-3 (S130) of setting a second range of interest for detecting the trend of an SOC of the energy storage device 400 and may include step 1-4 (S140) of calculating the average of the SOC of the energy storage device 400.

Figure 8:
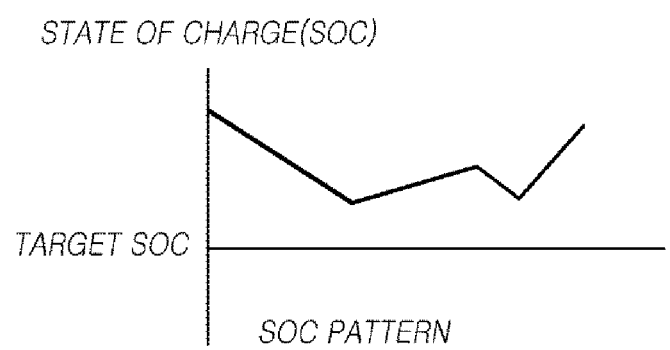
FIGS. 8 and 9 are views for explaining the method for controlling the battery of a mild hybrid vehicle according to the second embodiment of the present invention.
Figure 9:
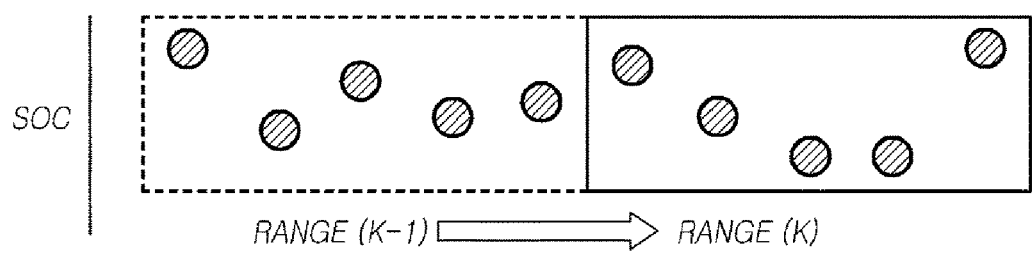

The trend of the SOC of the energy storage device 400 may be represented as illustrated in FIG. 8, and the second range of interest, which is a detection range of the SOC trend of the energy storage device 400, is set as illustrated in FIG. 9. The second range of interest may be set based on a preset time. In addition, an SOC of the energy storage device 400 may be detected during a counting operation at a predetermined interval, and the second range of interest may also be set based on a count number. As with the first range of interest, the second range of interest may be set to move as illustrated in FIG. 9 based on a predetermined time or a predetermined count number, which makes it possible to continually perform the step 1-3 (S130), and the second range of interest may be preferably set to be changed by a user as needed.

After the step 1-3 (S130), step 1-4 (S140) of calculating the average of the SOC of the energy storage device within the second range of interest is performed in order to quantify the SOC trend of the energy storage device 400, which is detected within the second range of interest.

After the step 1-4 (S140), step 2-4 (S240) of comparing an absolute value of the difference between the calculated average of the SOC of the energy storage device 400 and a target SOC of the energy storage device 400 with a third reference value set in advance is performed. When the comparison result in step 2-4 (S240) shows that the absolute value of the difference between the calculated average of the SOC of the energy storage device 400 and the target SOC of the energy storage device 400 is smaller than the third reference value, it is unnecessary to change and adjust the target SOC of the energy storage device 400 because the calculated difference between the average of the SOC of the energy storage device 400 and the target SOC of the energy storage device 400 is not large. Accordingly, the target SOC of the energy storage device 400 is maintained as it is without change.

In contrast, when the comparison result shows that the absolute value of the difference between the calculated average of the SOC of the energy storage device 400 and the target SOC of the energy storage device 400 is larger than the preset third reference value, step 2-5 (S250) of comparing the average of the SOC of the energy storage device 400 with the magnitude of the target SOC of the energy storage device 400 is performed. When the comparison result in the step 2-5 (S250) shows that the average of the SOC of the energy storage device 400 is larger than the target SOC of the energy storage device 400, step 2-6 (S260) of decreasing the target SOC of the energy storage device 400 is performed to restrain unnecessary engine power-generation. In contrast, when the comparison result shows that the average of the SOC of the energy storage device 400 is smaller than the target SOC of the energy storage device 400, step 2-7 (S270) of increasing the target SOC of the energy storage device 400 is performed to increase the charged amount of the battery through engine power-generation enhancement.

Figure 10:
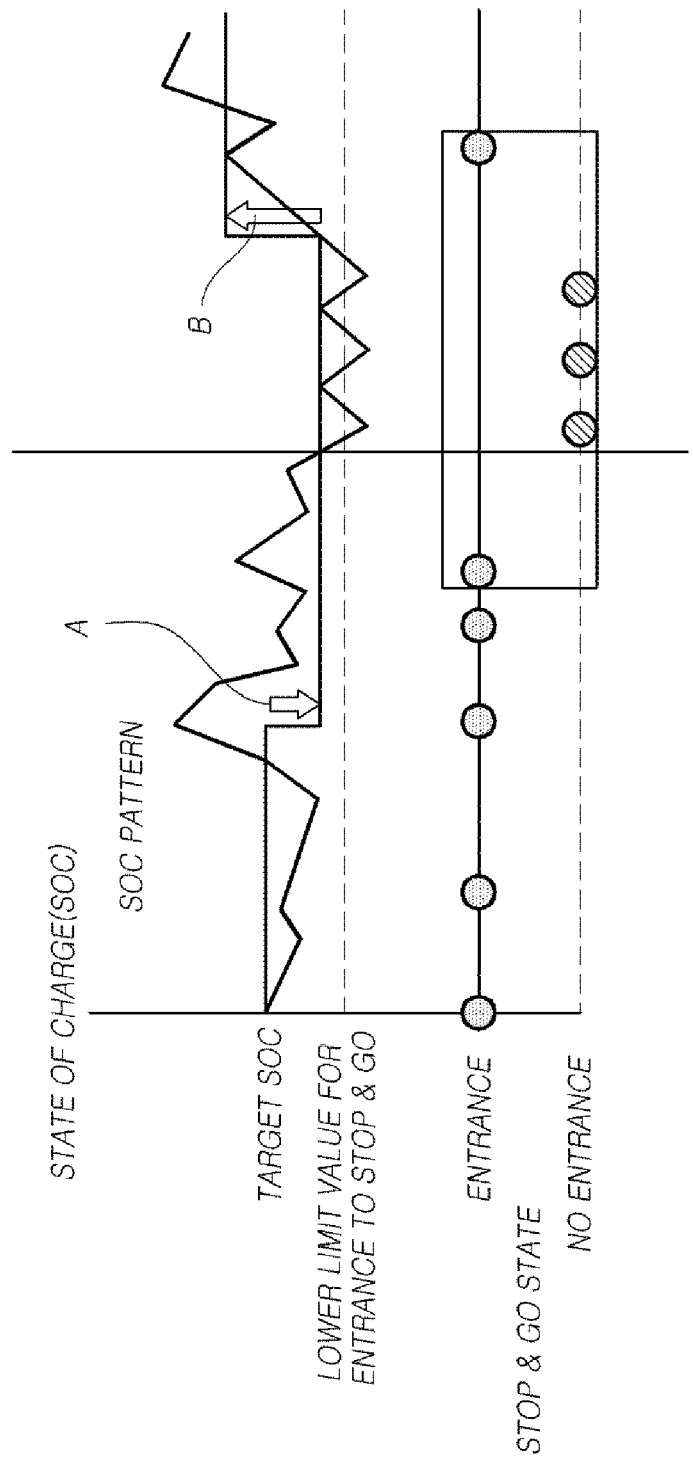
FIG. 10 is a view for generally explaining an operation of managing battery energy according to a method for controlling the battery of a mild hybrid vehicle according to the present invention.

As described above, the method for controlling the battery of a mild hybrid vehicle, according to the present invention, may be specifically operated based on the number of times that an entrance to Stop and DO is not permitted, as in the first embodiment, or based on an average of an SOC of the energy storage device 400 as in the second embodiment. However, as illustrated in FIG. 10, the battery control method may also be operated by simultaneously applying the first and second embodiments.

The embodiments described in this specification and the accompanying drawings correspond only to an illustrative explanation of a part of the spirit and scope of the present invention. Therefore, it is apparent that the embodiments disclosed in this specification are provided to explain the spirit and scope of the present invention, but are not to limit them, so that the spirit and scope of the present invention is not limited by the embodiments. It should be construed that modified examples and specific embodiments that those skilled in the art can easily infer without departing from the spirit and scope included in the specification and the drawings of the present invention are included in the spirit and scope of the present invention.

DESCRIPTION OF REFERENCE NUMERALS

100: Engine
200: Motor generator
300: Inverter
400: Energy storage device
500: Converter
600: Low-voltage battery
700: Belt

What is claimed is:

1. A method for controlling a battery of a mild hybrid vehicle comprising sensors and an electronic control unit (ECU), the method comprising:
   detecting, by the sensors disposed in the vehicle, traffic conditions based on a driving state of the vehicle; and
   adjusting, by the ECU of the vehicle, a target State of Charge (SOC) of an energy storage device, by increasing the target SOC or decreasing the target SOC, based on the detected traffic conditions,
   wherein the detecting comprises:
       setting, by the ECU, a first range of interest based on the number of times that the vehicle stops; and
       detecting, by the sensors, the number of times that a Stop and Go function does not operate due to a low SOC of the energy storage device within the first range of interest.

2. The method of claim 1, wherein the adjusting comprises:
   comparing the number of times that the Stop and Go function does not operate with first and second reference values set in advance;
   increasing the target SOC of the energy storage device, when the number of times that the Stop and Go function does not operate is larger than the first reference value; and
   decreasing the target SOC of the energy storage device, when the number of times that the Stop and Go function does not operate is smaller than the second reference value, and
   wherein the first reference value is larger than the second reference value.

3. A method for controlling a battery of a mild hybrid vehicle comprising sensors and an electronic control unit (ECU), the method comprising:
   detecting, by the sensors disposed in the vehicle, a traffic condition based on a driving state of the vehicle; and
   adjusting, by the ECU of the vehicle, a target State of Charge (SOC) of an energy storage device, by increasing the target SOC or decreasing the target SOC, based on the detected traffic condition,
   wherein the detecting comprises:
       setting, by the ECU, a second range of interest for detecting a trend of an SOC of the energy storage device; and
       calculating, by the ECU, an average of the SOC of the energy storage device within the second range of interest.

4. The method of claim 3, wherein the adjusting comprises:
   comparing an absolute value of the difference between the calculated average of the SOC of the energy storage device and the target SOC of the energy storage device with a preset reference value.

5. The method of claim 4, wherein the adjusting further comprises:
   comparing the calculated average of the SOC of the energy storage device and the target SOC of the energy storage device, when the comparison result of the comparing the absolute value with the preset reference value shows that the absolute value of the difference between the calculated average of the SOC of the energy storage device and the target SOC of the energy storage device is larger than the preset reference value;

decreasing the target SOC of the energy storage device, when the calculated average of the SOC of the energy storage device is larger than the target SOC of the energy storage device, and increasing the target SOC of the energy storage device, when the calculated average of the SOC of the energy storage device is smaller than the target SOC of the energy storage device.

6. The method of claim 3, further comprising:

storing the adjusted target SOC of the energy storage device in a memory.

7. The method of claim 1, further comprising:

generating, by a motor-generator of the vehicle, electrical energy;

converting, by an inverter of the vehicle, the generated electrical energy; and supplying, by the inverter of the vehicle, toe converted electrical energy to the battery of the vehicle for charging the battery of the vehicle.

8. The method of claim 3, further comprising:

generating, by a motor-generator of the vehicle, electrical energy;

converting, by an inverter of the vehicle, the generated electrical energy; and supplying, by the inverter of the vehicle, toe converted electrical energy to the battery of the vehicle for charging the battery of the vehicle.

* * * * *